(12) United States Patent
Huang et al.

(10) Patent No.: US 6,449,046 B1
(45) Date of Patent: *Sep. 10, 2002

(54) OPTICALLY AMPLIFIED WDM/TDM HYBRID POLARIZATION-INSENSITIVE FIBER-OPTIC INTERFEROMETRIC SENSOR SYSTEM

(75) Inventors: Shih-Chu Huang, Kaohsiung; Wuu-Wen Lin, Kaohsiung Hsien; Shoren-Chien Hung, Yen-Shui; Hung-Lung Chao, Kaohsiung, all of (TW)

(73) Assignee: Chung-Shan Institute of Science and Technology, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/313,168

(22) Filed: May 17, 1999

(51) Int. Cl.[7] .................................................. G01B 9/02
(52) U.S. Cl. ........................................ 356/478; 385/12
(58) Field of Search ...................... 356/478; 250/227.19, 250/227.27; 385/12

(56) References Cited

U.S. PATENT DOCUMENTS 5,946,429 A * 8/1999 Huang et al. .................. 385/12
6,211,964 B1 * 4/2001 Luscombe et al. .......... 356/477

* cited by examiner

Primary Examiner—Frank G. Font
Assistant Examiner—Phil Natividad
(74) Attorney, Agent, or Firm—J.C. Patents

(57) ABSTRACT

A polarization-insensitive fiber-optic interferometric sensor system has an erbium-doped fiber amplifier (EDFA) at a location between a light source and a sensing array to serve as a post amplifier. An output end of the sensing array is coupled to another EDFA, and further coupled to a receiver, in which this another EDFA is used as an in-line amplifier. As the sensor system is applied for a light source with multiple wavelengths, a dense wavelength division multiplexers (DWDMs) is used to combine the multiple wavelengths into one for amplification, and another DWDM is used to decouple the multiple wavelengths.

14 Claims, 12 Drawing Sheets

OPTICALLY AMPLIFIED WDM/TDM HYBRID POLARIZATION-INSENSITIVE FIBER-OPTIC INTERFEROMETRIC SENSOR SYSTEM

BACKGROUND OF THE INVENTION

1. Field of the Invention

This invention relates to a fiber optic sensor, and more particularly to a fiber optic interferometric sensor (FOIS).

2. Description of Related Art

An important feature of fiber optic interferometric sensors (FOIS) is its multi-plexing capability. Among different interferometric sensor multiplexing techniques, time-division multiplexing (TDM) has been shown to have low crosstalk and high sen-sitivity (U.S. Pat. No. 4,770,535). A polarization-induced signal fading effect severely occurs in a two-arm fiber optic interferometric sensor. A traditional way to overcome the polarization-induced signal fading effect is instead using polarization maintaining fibers to form sensors, but resulting in need of very expensive fibers and relevant components. It is also very difficult to configure the sensing arrays. It even more difficult to precisely align the axial direction of polarization maintaining fiber. As a result, the traditional way using polarization maintaining fiber in sensing arrays is not a practical solution. In order to reduce the polarization-induced signal fading effect, polarization-insensitive fiber optic Michelson interferometer was proposed (U.S. Pat. No. 5,206,924). This sensor includes a "Faraday rotator mirror (FRM)" that can eliminate the polarization fading effect by compensating it with a birefringence effect in a retraced fiber path. The reference paper reports a TDM polarization-insensitive fiber optic Michelson interferometric sensor (TDM-PIFOMIS) to overcome the polarization-induced signal fading effect by combining FRM with unbalanced Michelson interferometers and generating the interference signals by an optical path-matching compensating interferometer (CI). Details are also referred to U.S. patents application Ser. No. 08/806,671, "OPT. Lett., 20, pp.1244–1246, 1995", "J. Lightwave Technol., 14, pp.1488–1500, 1996", and "Appl. Phys. Lett., 39, pp. 530–532, 1981". The TDM-PIFOMIS system with the optical path-matching CI can also significantly reduce the phase-induced intensity noise (PIIN).

The TDM-PIFOMIS system needs a suitable demodulation circuit to demodulate signals from various sensors. The demodulation circuit usually includes phase-generated carrier (PGC) demodulation or passive symmetric demodulation using 3×3 fiber coupler (3×3 demodulation). A carrier phase signal of the PGC demodulation can be easily generated by a PZT phase modulator of a compensating interferometer in the TDM-PIFOMIS system so as to achieve high sensitivity with a larger dynamic range. For the 3×3 demodulation, there is no need of carrier phase signal. This yields a significant advantage to increase the bandwidth of interferometric sensors.

For most fiber-optic sensor multiplexing schemes, the optical power budget limits both the lead fiber length, over which fiber-sensor can be driven remotely, and the number of sensors.

SUMMARY OF THE INVENTION

It is at least an objective of the present invention to provide a polarization-insensitive fiber-optic interferometric sensor system using an erbium-doped fiber amplifier (EDFA). A transmission distance is effectively improved.

It is at least another objective of the present invention to provide a polarization-insensitive fiber-optic interferometric sensor system using an erbium-doped fiber amplifier (EDFA) so that a sensing array can even tolerate an optical loss of about 47 dB or higher. As a result, the system can includes more sensors.

It is at least still another objective of the present invention to provide a polarization-insensitive fiber-optic interferometric sensor system using wavelength-division multiplexing technologies so as to include a larger number of sensors by employing only one input and one output lead optical fibers. Fabrication cost and power consuming rate are effectively reduced. The structure of the sensor system is also simplified so as to have more useful applications in various environments to be detected.

In accordance with the foregoing and other objectives of the present invention, a polarization-insensitive fiber-optic interferometric sensor system is provided. The sensor system includes an optical pulse generator, a post erbium-doped fiber amplifier (EDFA), a first optical bandpass filter (OBPF), a 3-port optical circulator (3POC), a sensing array, an in-line EDFA, a second OBPF, and a receiver. The pulse generator is used to generate a low-repetition-rate optical pulse. The post EDFA is used to receive the optical pulse and amplify the optical pulse for an output. The first OBPF is used to receive and filter the optical pulse that is amplified by the post EDFA. The 3POC, having a first port, a second port, and a third port, is used to receive an output from the first OBPF at the first port. The sensor array coupled to the second port of the 3POC so as to also receive the out from the first OBPF through the 3POC and return an output to the 3POC. The in-line EFDA coupled to the third port of the 3POC so as to receive and amplify the output optical pulse of the array. A second OBPF is used to receive and filter the output from the in-line EDFA. The receiver receives the output from the second OBPF, in which the receiver preferably includes a time-division multiplexing 3×3 (TDM-3× 3) receiver or a TDM phase-generated carrier (TDM-PGC) receiver.

In accordance with the foregoing and other objectives of the present invention, an another polarization-insensitive fiber-optic interferometric sensor system is provided. The sensor system includes several optical pulse generator, a first dense wavelength-division multiplexer (DWDM), several post EDFAs, a second DWDM, several first OBPF, several 3POCs, several sensing arrays, a third DWDM, several in-line EDFAs, a fourth DWDM, several second OBPFs, and several receivers. Each of the receivers includes a TDM-3×3 receiver or a TDM-PGC receiver. Each of the optical pulse generators generates an optical pulse with specific wavelength. The first DWDM receives each output optical pulse of the optical pulse generators and exports a first combined optical pulse. The post EFDAs are coupled in series, in which a first one of the post EFDAs receives the first combined optical pulse and the last one of the post EFDAs exports the first combined optical pulse that is amplified by the post EFDAs. The second DWDM receives the amplified first combined optical pulse and exports several first amplified optical pulses with respect to each optical pulse with specific wavelength. Each of the 3POCs includes a first port, a second port, and a third port, in which each the first port respectively receives one of the first amplified optical pulses. Each of the sensing arrays respectively coupled to one of the 3POCs at the second port and returns an output to the coupled one of the 3POC. Each the third port of the 3POCs is coupled to the third DWDM so that the third DWDM receives each output of the sensing arrays through the 3POCs and exports a second combined optical pulse. The in-line EDFAs are coupled in series, in which the first one of the in-line EFDAs receives the second combined optical pulse and the last one of the in-line EFDAs exports the second combined optical pulse that is amplified by the in-line EFDAs. The fourth DWDM receives the amplified second combined optical pulse and exports several optical pulses with differently specific wavelengths. The second OBPFs respectively receive the second amplified optical pulses. The receivers respectively receive output signals from the second OBPFs, in which each of the receivers includes a TDM-3×3 receiver or a TDM-PGC receiver.

BRIEF DESCRIPTION OF DRAWINGS

The invention can be more fully understood by reading the following detailed description of the preferred embodiment, with reference made to the accompanying drawings as follows.

DETAILED DESCRIPTION OF PREFERRED EMBODIMENTS

EXAMPLE 1

Figure 1:
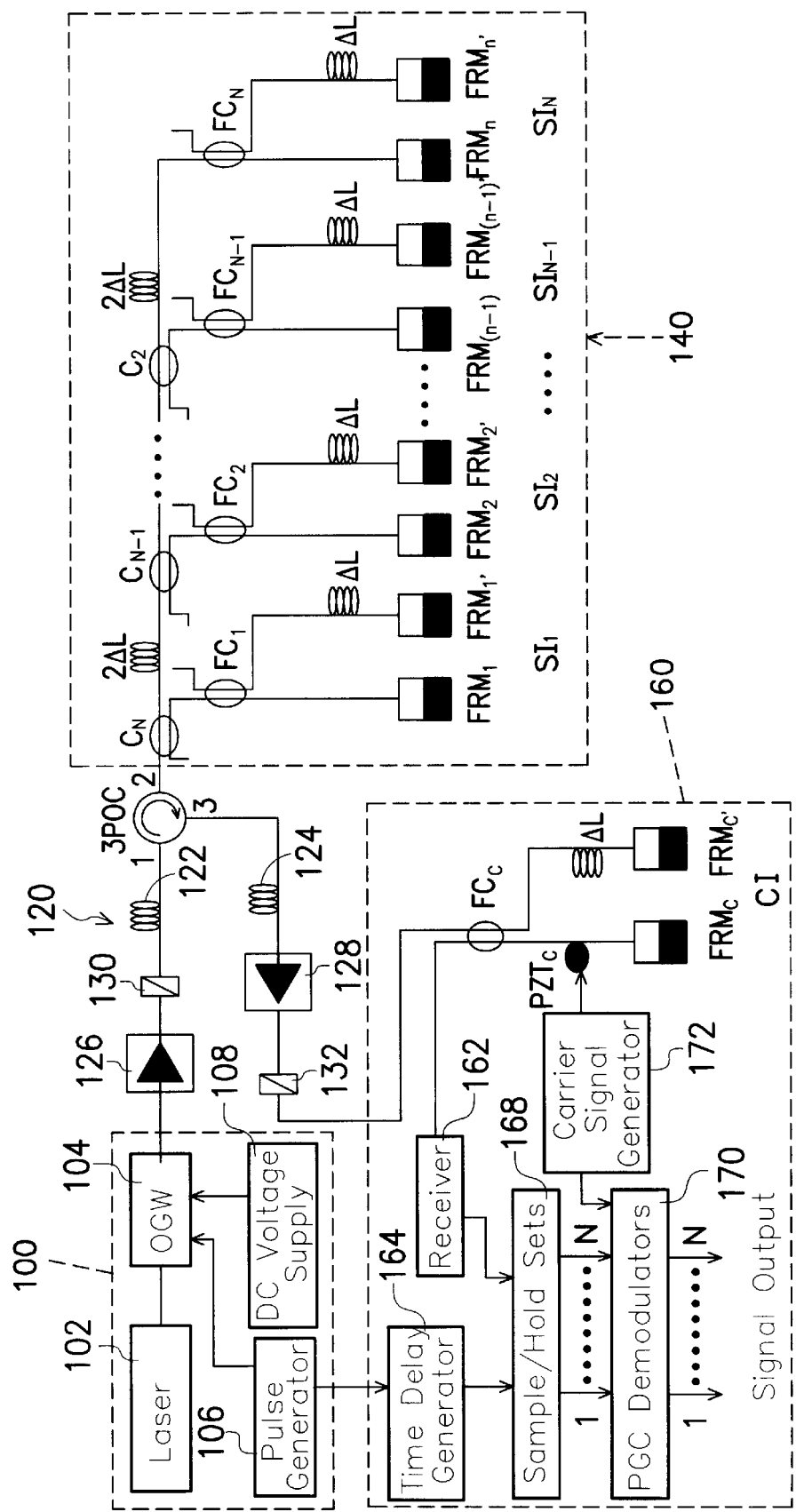
FIG. 1 is a structure diagram, schematically a structure of a TDM-PIFOMIS system using a PGC demodulation, according to the first preferred embodiment of the invention.

FIG. 1 is a structure diagram, schematically a structure of a TDM-PIFOMIS system using a PGC demodulation, according the a first preferred embodiment of the invention. In FIG. 1, a TDM polarization-insensitive fiber optic Michelson interferometric sensor (TDM-PIFOMIS) system using a PGC demodulation includes four main parts: an optical pulse generator 100, a lead fiber subsystem 120, a sensing array 140, and a TDM receiver 160. The optical pulse generator generates a low-repetition-rate optical pulse with narrow pulse width and high ER. The optical pulse generator 100 further includes an optical-guided-wave (OGW) intensity modulator 104 so as to modulate a continuous lightwave from a laser source 102. The OGW 104 usually includes a high impedance (>1000 Ω) DC bias electrode and a 50 Ω impedance radio frequency (RF) electrode. The OGW 104 is driven by a pulse generator 106 and a precision DC voltage supply 108 respectively through the RF electrode and the DC bias electrode. An input electrical pulse amplitude generated by the pulse generator 106 is, for example, kept at the half-wave voltage $V_\pi$ of the OGW 104 so as to obtain the maximum output optical pulse amplitude. The bias voltage $V_{BIAS}$ generated by the precision DC voltage supply 108 is precisely adjusted to generate the output optical pulse with high ER. The sensing array 140 include N unbalanced sensing interferometer (SI) sets ($SI_1, SI_2, \ldots, SI_N$). Each of the SI sets includes one fiber coupler (FC) and two Faraday rotator mirrors (FRMs) forming a pair. Two optical fiber paths of the two FRMs in each pair are different with a difference of $\Delta L$ in length. The lead fiber subsystem 120 includes an input lead fiber 122 and an output lead fiber 124, a 3-port optical circulator (3POC), a post EDFA 126, and an in-line EDFA 128. In the specification, EDFA is a preferable amplifier and can be replaced by other type of amplifier, such as an optical amplifier. The TDM receiver 160 includes a compensating interferometer CI, which includes a $FRM_C$ and a $FRM_{C'}$, an optical receiver 162, a time delay generator 164, a sample/hold circuit 168, a PGC demodulator 170, and a carrier signal generator 172. The TDM receiver 160 includes, for example, an InGaAs PIN optical receiver used to convert interfered pulse trains into electrical signals. The compensating interferometer CI is coupled to the optical receiver 162 and an optical bandpass filter (OBPF) 132 through a 2×2 fiber coupler. The time delay generator 164 is coupled to the pulse generator 106. The carrier signal generator 172 is coupled between the PGC demodulator 170 and a PZT phase modulator of the compensating interferometer CI.

In the foregoing, all the unbalanced SI sets have equal light path difference $\Delta L$ to the CI of the TDM receiver 160. Generally, each sensor unit of the sensing array 140 preferably has an equal output power. Power splitting ratios of all fiber couplers ($FC_1, FC_2, \ldots, FC_N$) are 1:1 in order to obtain the maximum visibility of the output intensity of each sensor unit. The power splitting ratios $X_k$ of several fiber couplers ($C_N, C_{N-1}, \ldots, C_2$), which are separately coupled to the SI sets, are different in order to obtain equaled output power of each sensor. The $X_k$ (here, $2 \leq k \leq N$) has been derived and calculated in a paper published in J. Lightwave Technol., 14, pp. 1488–1500, 1996. The TDM-PIFOMIS system with a property of equal optical path difference $\Delta L$ between the CI and all sensors can significantly reduce fundamental phase-induced intensity noise (PIIN).

In the TDM-PIFOMIS system, there are three locations can be equipped with EDFA. One serving as the post EDFA 126 is coupled between the OGW 104 and the sensing array 140. One serving as the in-line EDFA 128 is coupled between the sensing array 140 and the CI of the TDM receiver 160. One serving as a pre-EDFA is coupled between the CI and a photodetector receiver 162 of the TDM receiver 160, in which the pre-EDFA located before the photodetector receiver 162 is not useful owing to the unstable amplification for the optical pulse trains with interference signals of the sensing array 140. For example, the unstable optical gain of the pre-EDFA is induced by the fluctuated optical pulse trains. For the in-line EDFA 128, since the amplitudes of the optical pulse trains propagating in the output lead fiber 124 of the TDM-PIFOMIS system are stable, the amplitudes of the optical pulse trains are stable after being amplified by the in-line EDFA 128. A preferred coupling architecture includes only the post EDFA 126 and the in-line EDFA 128 even though the pre-EDFA maybe also included.

Figure 2:
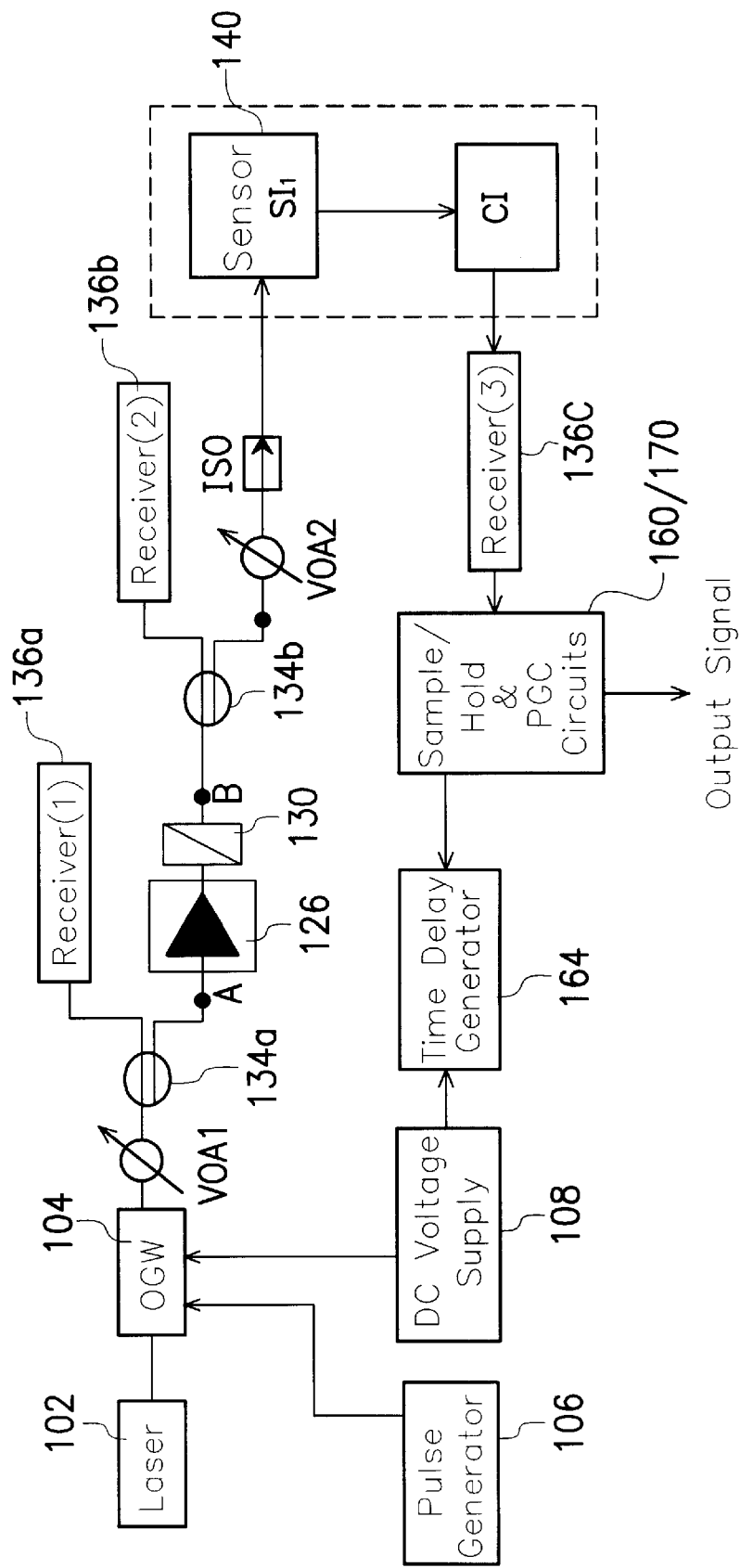
FIG. 2 is a structure diagram, schematically an experimental arrangement for the EDFA used as a post amplifier, according to the first preferred embodiment of the invention.
Figure 3:
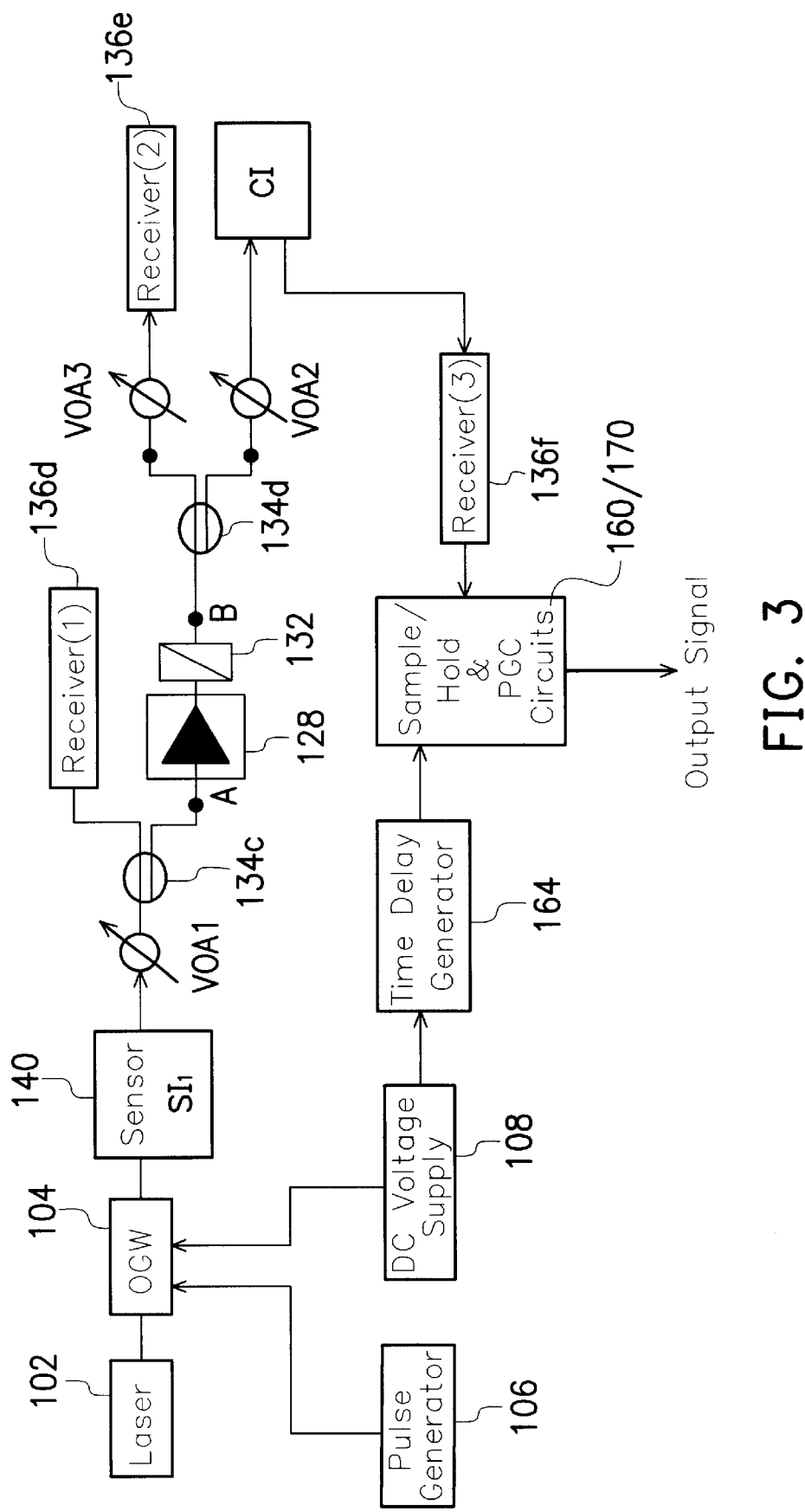
FIG. 3 is a structure diagram, schematically an experimental arrangement for the EDFA used as in-line amplifier, according to the first preferred embodiment of the invention.

An experiment is performed to investigate how the sensing capability is improved by the post EDFA 126 and the in-line EDFA 128, both of which are introduced in the invention. FIG. 2 is a structure diagram, schematically an experimental arrangement for the EDFA used as a post amplifier, according to the first preferred embodiment of the invention. FIG. 3 is a structure diagram, schematically an experimental arrangement for the EDFA used as an in-line amplifier, according to the first preferred embodiment of the invention. In FIG. 2 and FIG. 3, for more convenient descriptions, only one $SI_1$, set in the sensing array 140 is shown. A structure with multiple SI sets is described later. Moreover, in the experiment, the sensing array 140 and the CI of the TDM receiver 160 (FIG. 1) are put in a vibration-isolated, acoustic-shield box so as to prevent any ambient perturbations so that more precise experimental data can be obtained.

In FIG. 2, there are two 1:99 (1%) monitoring couplers 134a, 134b. The monitoring coupler 134a is located before the post EDFA 126 and the monitoring coupler 134b is located after an optical bandpass filter (OBPF) 130. Both the monitoring couplers 134a, 134b are respectively used to tap off an input signal power and an amplified output signal power of the post EDFA 126. The OBPF 130 is used to filter out an amplified spontaneous emission (ASE) noise from the post EDFA 126 so as to maintain high ER and to reduce system phase noise level. The OBPF 130 has bandwidth of 1 nm at 0.5 dB and an insertion loss of about 1.5 dB. A variable optical attenuator (VOA1) coupled between the OGW 104 and the monitoring coupler 134a is used to control the input signal power level of the post EDFA 126. A variable optical attenuator (VOA2) coupled after the monitoring coupler 134b is used to control the amplified output signal power level into the sensor $SI_1$.

In FIG. 3, the in-line EDFA 128 is included. Similarly, there are two 1:99 (1%) monitoring couplers 134c, 134d. The monitoring coupler 134c is located before the in-line EDFA 128 and the monitoring coupler 134d is located after the optical bandpass filter (OBPF) 132. Both the monitoring couplers 134c, 134d are respectively used to tap off an input signal power and an amplified output power of the post EDFA 128. The OBPF 132 is used to filter out an amplified spontaneous emission (ASE) noise from the in-line EDFA 128 so as to maintain high ER and to reduce system phase noise level. The sensor $SI_1$ 140 is coupled after the OGW 104. The VOA1 coupled between the sensor $SI_1$ 140 and the monitoring coupler 134c is used to control the input signal power level of the in-line EDFA 128. The VOA2 coupled after the monitoring coupler 134d is used to control the launched input signal power into the CI.

Figure 4:
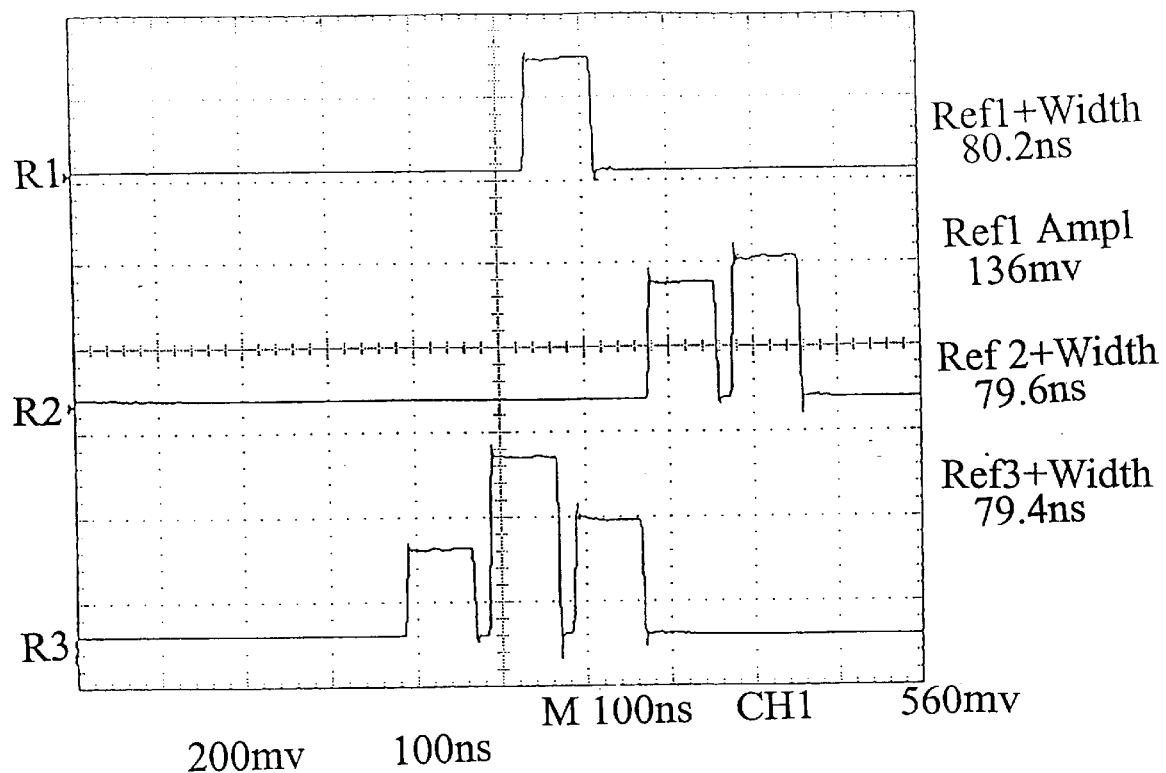
FIG. 4 is a waveform drawing, schematically illustrating typical several types of pulse train, according to the first preferred embodiment of the invention.
Figure 5:
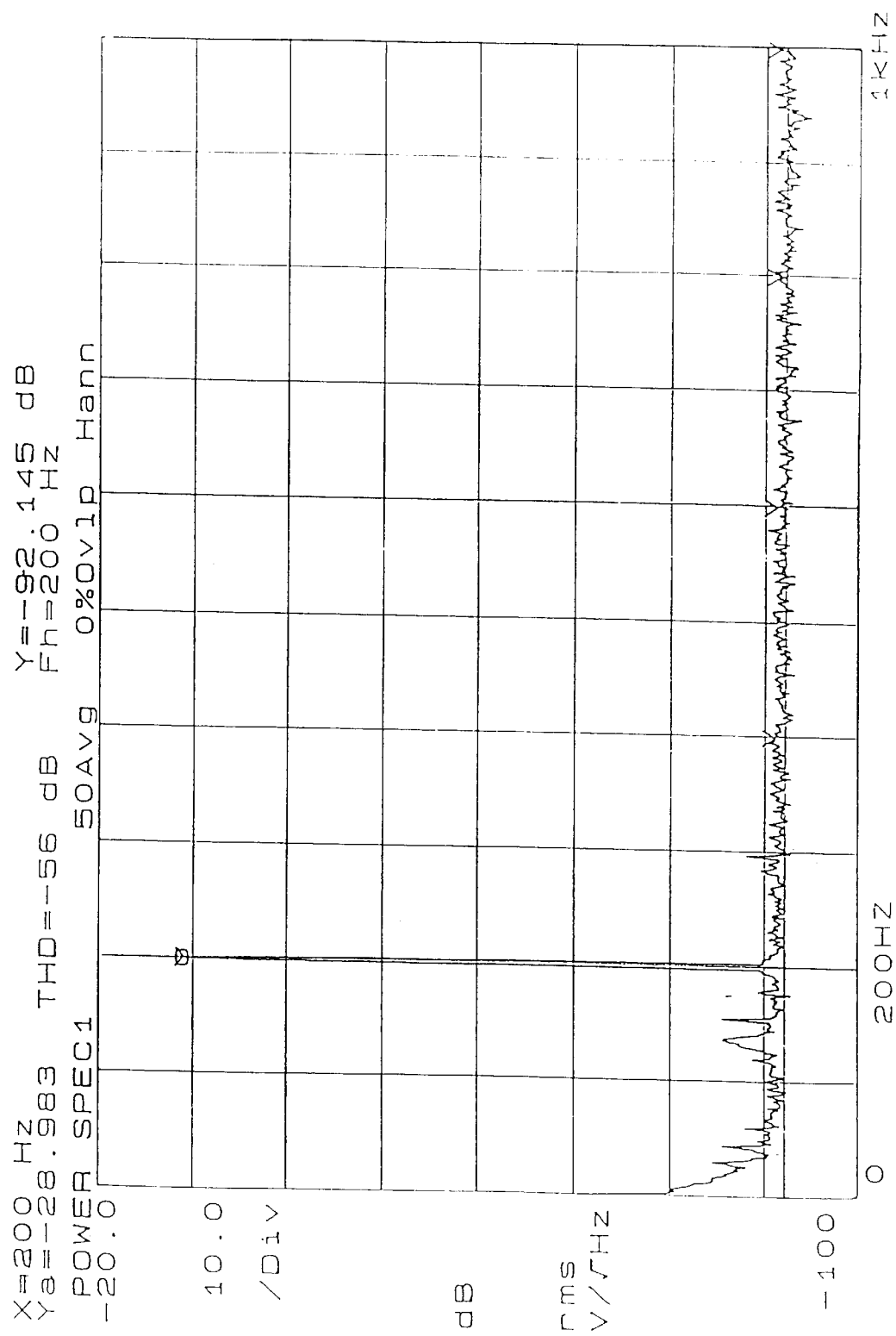
FIG. 5 is a frequency spectrum, schematically illustrating an output spectrum of the demodulated signal at 200 Hz when the ER of the optical pulse is 33 dB without EDFA in the TDM-PIFOMIS system, according to the first preferred embodiment of the invention.

A test signal at 200 Hz is generated by a signal generator for test in the experiment. The test signal is applied upon one of the sensor's fiber arm through a PZT phase modulator to provide an effective phase signal of $3.4 \times 10^{-2}$ rad/(Hz)$^{1/2}$. A carrier signal with 20 kHz, generated by other signal generator, is applied upon one of the CI's fiber arm through another PZT phase modulator to provide an optimum phase of 2.37 rad for the PGC demodulator. The interference pulse trains are detected by the receiver and the sensing signal is demodulated by the PGC demodulator. In FIG. 4, the upper signal train is an output waveform from the OGW 104, the middle signal train is an output waveform from the $SI_1$ 140, and the lowest signal train is an output waveform from the CI's fiber arm. After demodulation of the PGC demodulator 170, a test signal with 200 Hz is shown in FIG. 5. FIG. 5 is a frequency spectrum, schematically illustrating an output spectrum of the demodulated signal at 200 Hz when the ER of the optical pulse is 33 dB without EDFA in the TDM-PIFOMIS system, according to the first preferred embodiment of the invention.

In FIG. 2 and FIG. 3, the input signal power of the post EDFA 126 or the in-line EDFA 128 is adjusted by adjusting the VOA1. The amplified output signal power of the post EDFA 126 or the in-line EDFA 128 is adjusted by adjusting the VOA2. A received optical peak power of about −14 dBm is therefore obtained so as to keep a peak-to-peak voltage of the output interference signal of the sample/hold circuit 160 to be about 10 Volts in all measurements. The waveforms of the input signal pulse and the amplified output signal pulse of the post EDFA 126 are respectively detected by a monitoring receiver 136a and a monitoring receiver 136b in FIG. 2, in which the waveforms are schematically shown in FIG. 4 at the top train. FIG. 4 is a waveform drawing, schematically illustrating typical several types of pulse train, according to the first preferred embodiment of the invention. Similarly, the waveforms of the input signal pulse and the amplified output signal pulse of the in-line EDFA 128 are respectively detected by a monitoring receiver 136c and a monitoring receiver 136d in FIG. 3, in which the waveforms are schematically shown in FIG.4 at the middle train.

Figure 6A:
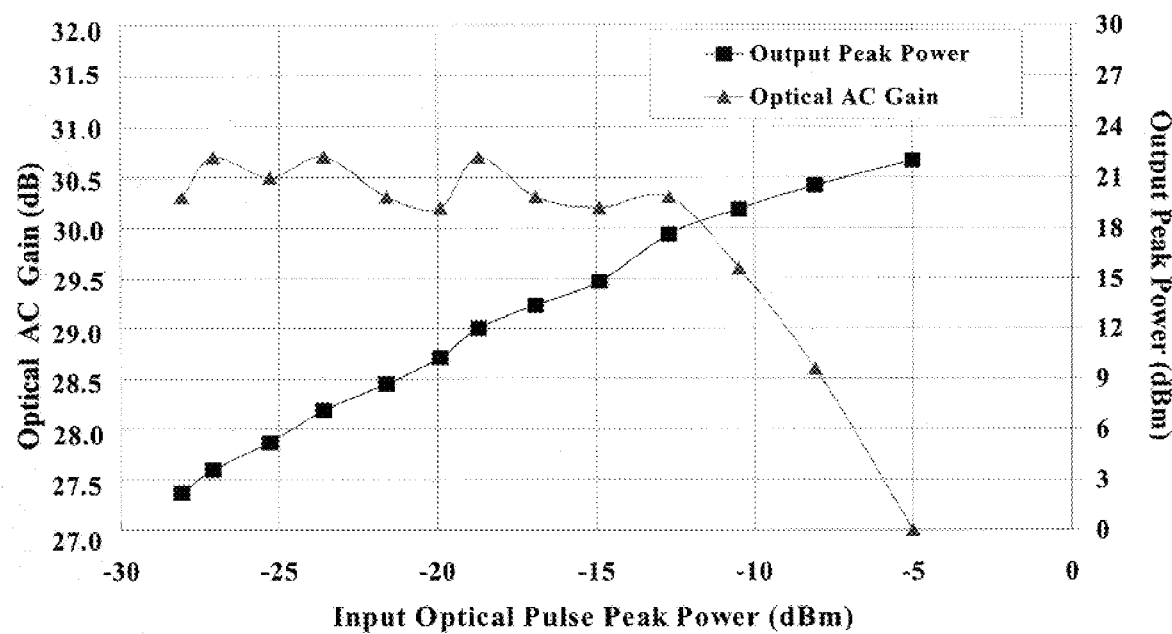
FIG. 6A and FIG. 6B schematically illustrate the output peak power (at point B of FIGS. 2 and 3) and the optical. gain versus the peak power of the input pulse (at point A of FIGS. 2 and 3) for the EDFA as a post and an in-line amplifier, respectively, according to the first preferred embodiment of the invention.
Figure 6B:
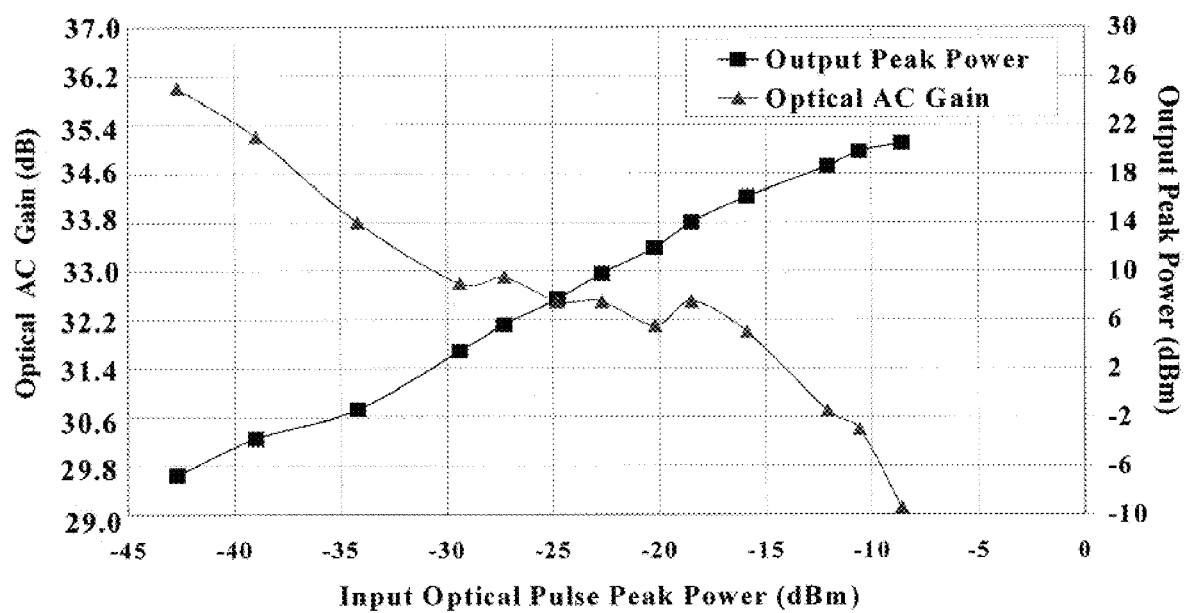

FIG. 6A and FIG. 6B schematically illustrate the output peak power (at point B of FIGS. 2 and 3) and the optical gain versus the peak power of the input pulse (at point A of FIGS. 2 and 3) for the EDFA as a post and an in-line amplifier, respectively, according to the first preferred embodiment of the invention. In FIGS. 6A and 6B, an alternative current (AC) gain, such as the optical gain for the EDFAs 126, 128 with modulated pulses, is higher than a DC gain, such as the optical gain for the EDFAs 126, 128 with un-modulated continuous-wave(CW) light). This is because the low-duty-cycle optical pulse is less saturating than the CW light. For example, for the input light power level at −5 dBm, the AC gain and output power are 27 dB and 22 dBm, respectively, as the DC gain and the output are 17.3 dB and 12.8 dBm, respectively.

Figure 7A:
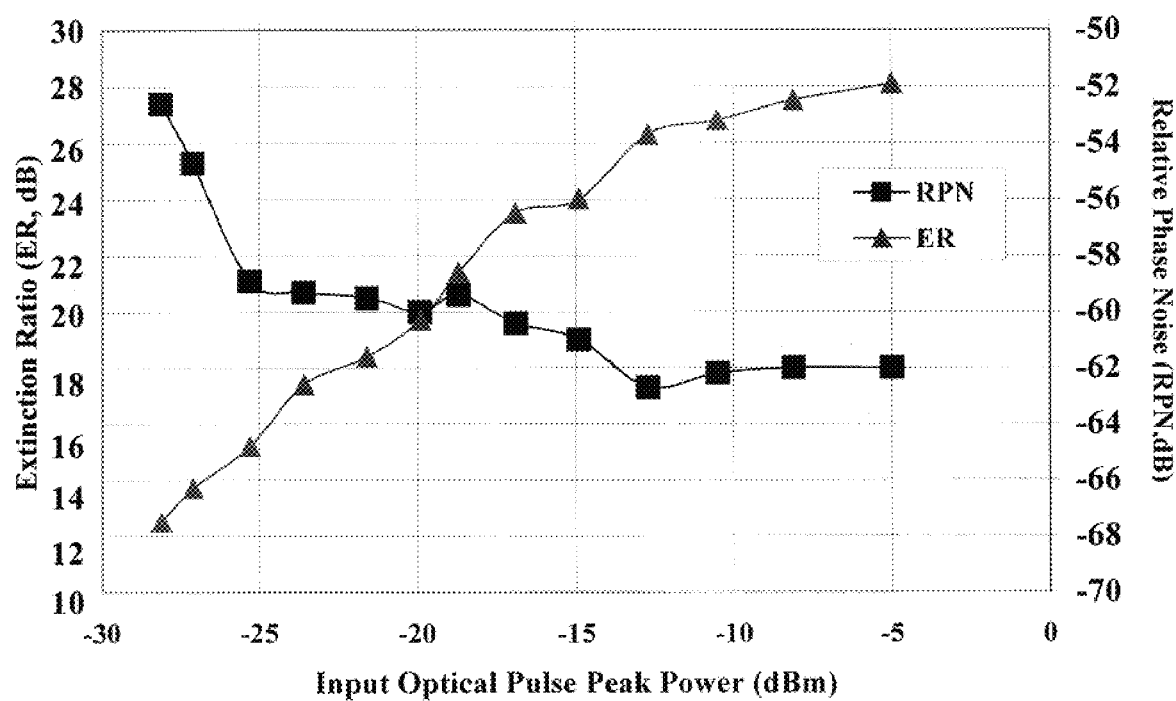
FIG. 7A and FIG. 7B schematically illustrate the ER and the relative phase noise (RPN) versus the peak power the input pulse for the EDFA as a post and an in-line amplifier, respectively, according to the first preferred embodiment of the invention.
Figure 7B:
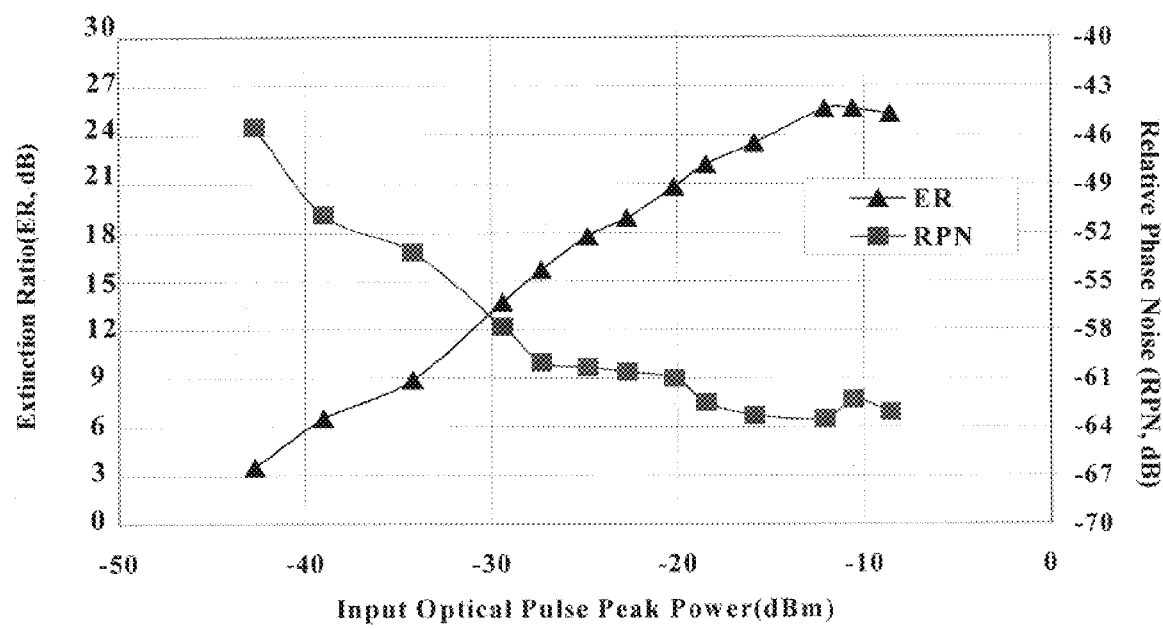

FIG. 7A and FIG. 7B schematically illustrate ER and relative phase noise (RPN) versus the peak power of the input pulse for the EDFA as a post and an in-line amplifier, respectively, according to the first preferred embodiment of the invention. In FIGS. 7A and 7B, the larger the input light power, the higher the ER for both post EDFA 126 and in-line EDFA 128. A minimum phase detection sensitivity (MPDS) can be calculated from the RPN quantity, in which MPDS= $3.4 \times 10^{-2} \times 10^{PRN/20}$ rad/(Hz)$^{1/2}$.

The MPDS of an un-amplified TDM-PIFOMIS system with ER of 33 dB is about $2.4 \times 10^{-5}$ rad/(Hz)$^{1/2}$ at about 1 kHz, as shown in FIG. 5. In order to assure the optically amplified TDM-PIFOMIS system to be operated with low phase noise, it is necessary that the RPN level is maintained to be less than 3 dB, which is the quantity for the un-amplified system. Thus, the allowable maximum RPN level is about −60 dB for the TDM-PIFOMIS system. This means that the MPDS preferably is better than $3.4 \times 10^{-5}$ rad/(Hz)$^{1/2}$ at about 1 kHz. To satisfy these requirements, the worst ERs for the post EDFA 126 and the in-line EDFA 128 respectively are, for example, about 20 dB and 17.8 dB, as shown in FIGS. 7A and 7B. Thus, the minimum required peak power level of the input optical pulse for the post and the in-line amplifier cases respectively are −20 dBm and −25 dBm, as shown in FIGS. 6A and 6B. The corresponding output peak power levels are 9.5 dBm and 6.9 dBm, respectively. In this condition, the optical gain for the post EDFA 126 and the in-line EDFA 128 respectively are 29.5 dB and 31.9 dB. In this experiment, the maximum launched peak power levels of the input optical signal pulses into the post EDFA 126 and the in-line EDFA 128 respectively are −5.0 dBm and −8.6 dBm.

In the invention, experimental results shows the feasibility of using an EDFA in the PGC-demodulated TDM-PIFOMIS system as a post and an in-line amplifier. The EDFA, particularly for the in-line EDFA 128 coupled after the output lead fiber 124 shown in FIG. 1, does not degrade the interference optical phase sensing signal from the sensing array 140. The amplitudes of the optical pulse trains, for example, in FIG. 4 are very stable after being amplified by the in-line EDFA 128. This is one significant advantage of the optically amplified TDM-PIFOMIS system.

Moreover, the improved power budget can effectively increase the number of sensors and transmission distance for a field application. In the TDM-PIFOMIS system, the number of sensors included in the invention is determined by operating conditions of the post EDFA 126 and the in-line EDFA 128. In FIG. 1, the EDFAs 126, 128 are respectively coupled to a port 1 and a port 3 of the 3POC, which is located in front of the sensing array 140. The 3POC has a property to forwardly pass signals to the next port so that when the optical signal pulses returns from the sensing array 140 is forwardly passed to the in-line EDFA 128 without affecting the post EDFA 126. According to the current operating conditions in the TDM-PIFOMIS system, for example, the minimum required peak power level of the input signal pulse for the in-line EDFA 128 is −25 dBm. In order to obtain a desired high output power of about 22 dBm, the peak power of the input signal pulse for the post EDFA 126 is necessary to have −5dBm. As a result, the sensing array of the system can tolerate a power loss budget of about 47 dB.

The FRM, 3POC, and 3 dB-FC respectively have single-pass insertion loss of 1 dB, 1 dB, and 3 dB. An excess loss of the 3 dB-FC is 0.2 dB. The upper limit of the allowable number of the sensing arrays for the system with post and in-line EDFAs is 32. Further considering the settling time of the high-resolution sample-and-hold circuit, it is a challenging achievement to demodulate the pulse trains of a 32-sensors array. So, utilization of sensor subarrays can solve this problem. For example, a 16-sensor sub-array system may have loss of about 36 dB. As a result, the 47-dB loss budget can be used for a typical four-sub-array (about 42.6 dB) TDM-PIFOMIS system with 16 sensors per sub-array. Hence, a 1×4 fiber coupler (FC) with equal splitting ratio and four separate sets of 3POC, in-line EDFA 128, output lead fiber 124, and TDM optical receiver are allowable for such a four-sub-array system. In this situation, the system complexity and cost may increase. In order to further improve this TDM-PIFOMIS system with multiple-sub-array-system, a second preferred embodiment is proposed.

EXAMPLE 2

Figure 8:
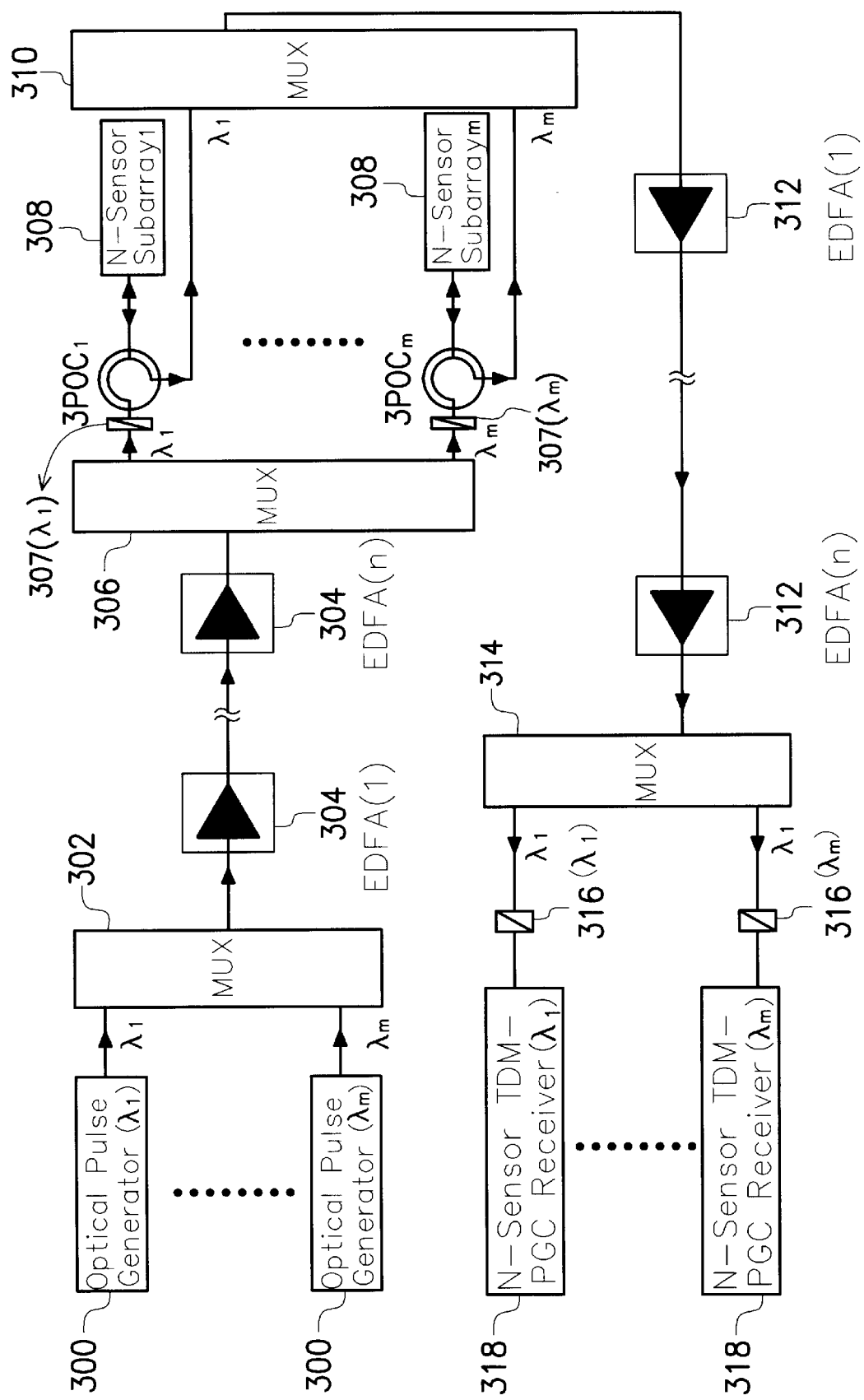
FIG. 8 is a structure diagram, schematically illustrating a structure of an optically amplified WDM/TDM hybrid PIFOMIS system using the PGC demodulation as a receiver, according to the second preferred embodiment of the invention.

An optically amplified WDM/TDM hybrid PIFOMIS system using the PGC demodulation shown in FIG. 8 is proposed to replace the TDM-PIFOMIS system with a sub-array system. FIG. 8 is a structure diagram, schematically illustrating a structure of an optically amplified WDM/TDM hybrid PIFOMIS system using the PGC demodulation as a receiver, according to the second preferred embodiment of the invention.

In FIG. 8, an optically amplified WDM/TDM hybrid PIFOMIS system includes, for example, several optical pulse generators 300 to respectively generate several optical signal pulses, such as m optical signal pulses with respect to wavelengths $\lambda_1, \ldots,$ and $\lambda_m$. The optical signal pulses are multiplexed by an m-channel DWDM 302 (1×m DWDM, with ≧0.5 nm passband), which combines all these various optical signal pulses to form a first combined optical pulse. The first combined optical pulse is exported to a first one, EDFA(l) of several post EDFAs 304. The post EDFAs 304 are coupled in series through an input lead fiber 122 in between (not shown in FIG. 8 but referred to FIG. 1). The first combined optical pulse propagates through the post EDFAs 304 for amplification and reach the last one EDFA (n), in which n depends on a practical application but at least one. An output of the post EDFA(N) is demultiplexed by a high isolation 1×m DWDM 306 to output several amplified signal pulses with respect to wavelengths $\lambda_1, \ldots, \lambda_m$. The m outputs of the 1×m DWDM 306 are used as input optical signal pulses for m subarrays 308 through several optical bandpass filters (OBPFs) 307 with respect to wavelengths $\lambda_1, \ldots, \lambda_m$ to filter out ASE noise from the post EDFAs and 3POCs (3POC$_1$, ..., 3POC$_m$). Each OBPF 307 is respectively coupled between the DWDM 306 and each 3POC. Each of the m subarrays 308 includes, for example, N sensors. The m subarrays 308 respectively return several optical signals to the 3POCs and are multiplexed by a high isolation 1×m DWDM 310. Each of the 3POCs has property to forwardly pass signals to the next port so that these returned optical signals are not passed back into the 1×m DWDM 306. The coupling architecture is, for example, that the outputs of the DWDM 306 are respectively coupled to the first ports of the 3POCs, the sensing arrays 308 are respectively coupled to the second ports of the 3POCs, and the DWDM 310 is coupled to all the third ports of the 3POCs. The DWDM 310 combines the returned optical signals into a second combined optical pulse that is exported to several in-line EDFRAs 312 from the first one of EDFA (1) 312 to the last one of EDFA(n) 312 in series. The output lead fiber 124 of FIG. 1 (not shown in FIG. 8) are coupled in between the in-line EDFAs 312 to form a series coupling. The second combined optical pulse is amplified by the in-line EDFAs 312 and is exported to a 1×m DWDM 314, which demultiplexes the secondly combined optical pulse into m second amplified optical signal pulses with respect to the wavelengths $\lambda_1, \ldots, \lambda_m$. The m second amplified optical signal pulses are respectively filtered by m units of OBPFs 316 so as to reduce crosstalk effects between the m processed optical signal pulses and to filter out ASE noise from the in-line EDFAs. Outputting ends of the OBPFs 316 are respectively coupled into m CIs of FIG. 1 (not shown in FIG. 8) that are used to generate interference signals, and then are respectively demodulated by m TDM receivers 318.

For an example with m=4, this optically amplified WDM/TDM hybrid PIFOMIS system can reduce three in-line EDFAs 128 and three output lead fibers 124. The optically amplified WDM/TDM hybrid PIFOMIS system is effectively simplified, giving several advantages at least including greatly simplified fabrication process and reduced electrical power consumption for field application.

In underwater application, lead fiber length of the WDM/TDM hybrid PIFOMIS system possibly need several hundreds of km. A transmitted power of a long single-mode fiber usually is limited by stimulated Brillouin scattering (SBS) effect. For a 1.55 μm continuous wave laser source, its linewidth is necessary to be less than 16 MHz and propagation length of the single-mode fiber is larger than 22 km, and a threshold power is estimated to be about 3 dBm. In the optically amplified WDM/TDM hybrid PIFOMIS system, a duty cycle of the optical pulse propagated in the input lead fiber 122 is only about 1(2N+1) for each wavelength. For a typical value of N=16, the threshold power of the SBS is about 18 dBm for each wavelength. This is an upper limit of the output power of the post EDFA(1) to be able to efficiently propagate in the input lead fiber 122. Additionally, the minimum required peak power level of the input optical signal pulse for each post EDFA 126 is about −20 dBm for each wavelength so as to assure the optically amplified WDM/TDM hybrid PIFOMIS system to be operated with low phase noise. Therefore, the allowable transmitted loss between two neighboring post EDFAs 126 can be even as high as about 38 dB if the output power of the post EDFA is enough. The duty cycle of the optical pulse propagated in the output lead fiber is about 1, the threshold power is about 3 dBm for each wavelength. This is an upper limit output power of the in-line EDFA (1) to be able to efficiently propagate in the output lead fiber 124. Additionally, the minimum required peak power level of the input optical pulse for each in-line EDFA 128 is about −25 dBm for each wavelength to assure the optically amplified WDM/TDM hybrid PIFOMIS system to be operated with low phase noise. As a result, the allowable transmitted loss between two in-line amplifiers can be even as high as 28 dB. Multiple post EDFAs 126 and multiple in-line EDFAs 128 respectively used with the input lead fiber 122 and the output lead fiber 124 can increase the transmitted distance.

Moreover, the TDM receiver 160 in FIG. 1 or the TDM receivers 318 in FIG. 8 can include a TDM-PGC receiver or a TDM-3×3 receiver. The TDM-3×3 receiver needs no carrier phase signal, and resulting in a further improvement to increase the sensor bandwidth.

Figure 9:
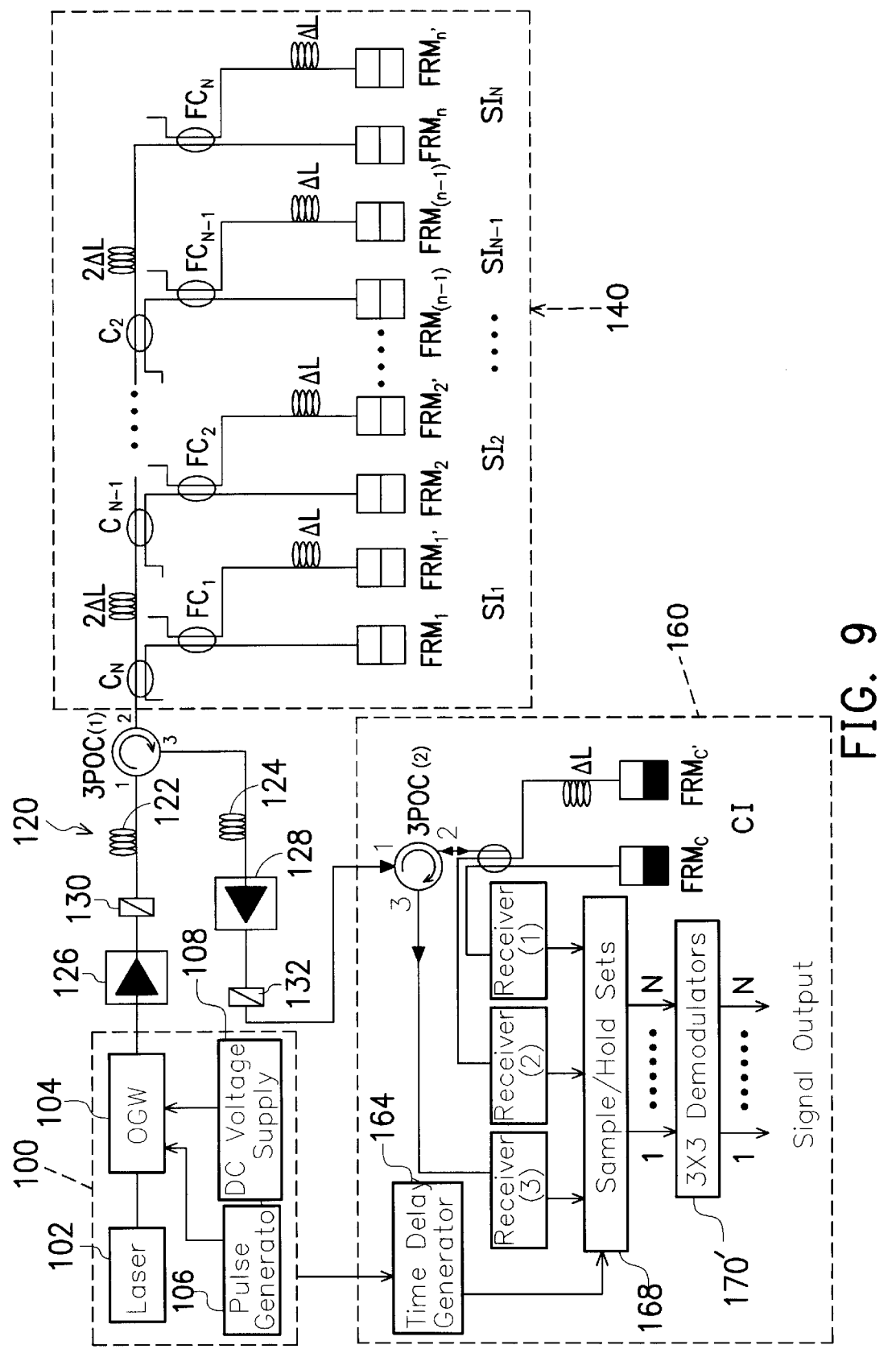
FIG. 9 is a structure diagram, schematically illustrating a structure of a TDM-PIFOMIS system using 3×3 demodulation, according to the first preferred embodiment of the invention.

FIG. 9 is a structure diagram, schematically illustrating a structure of a TDM-PIFOMIS system using 3×3 demodulation, according to the first preferred embodiment of the invention. FIG. 9 is similar to FIG. 1 with a difference of the TDM receiver 160, which is a TDM-PGC receiver 160 in FIG. 1 and is a TDM-3×3 receiver 160 in FIG. 9. The receiver type does not affect the characteristics of the invention. If the TDM-3×3 receiver is used as shown in FIG. 9, the structure of the TDM receiver 160 includes another 3POC(2). The TDM-3×3 receiver 160 further includes, for example, a 3×3 fiber coupler, the time delay generator 164, the sample/hold circuit 168, several 3×3 demodulators 170 with a proper coupling, and a compensating interferometer CI, which includes a FRM$_C$ and a FRM$_C$ as shown in FIG. 9. One arm of the 3×3 fiber coupler is coupled to a second port of the 3POC(2). The first port of the 3POC(2) is coupled to the OBPF 132. A third port of the 3POC(2) is coupled to an optical receiver(3). An optical receiver(2) and an optical receiver(1) are respectively coupled to these two output arms of the 3×3 fiber coupler.

Figure 10:
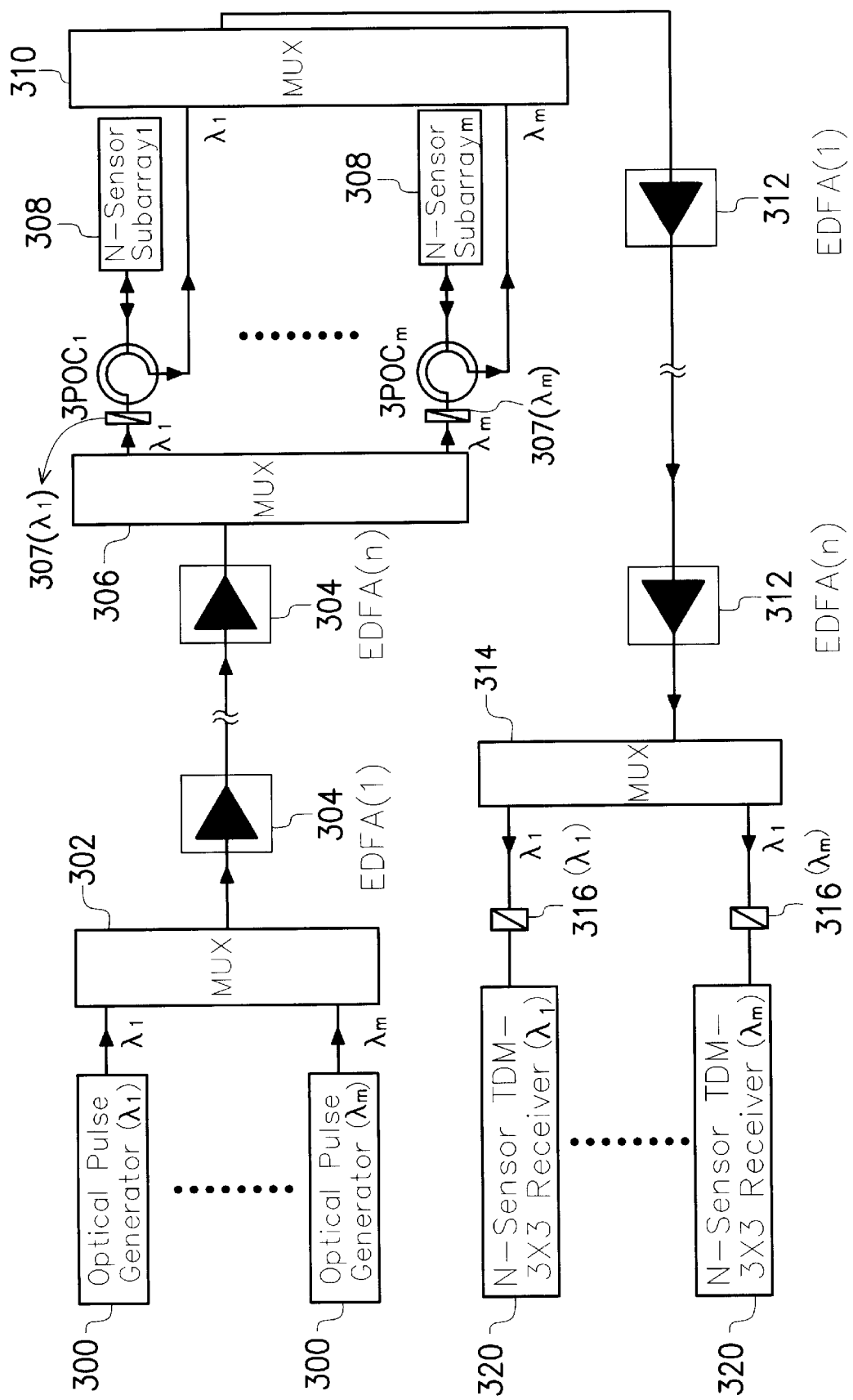
FIG. 10 struture diagram, schematically illustrating a structure of an optically amplified WDM/TDM hybrid PIFOMIS system using the 3×3 demodulation, according to the second preferred embodiment of the invention.

FIG. 10 is a structure diagram, schematically illustrating a structure of an optically amplified WDM /TDM hybrid PIFOMIS system using the 3×3 demodulation, according to the second preferred embodiment of the invention. Again, FIG. 10 is similar to FIG. 8 with a difference between the TDM-PGC receivers 318 and the TDM-3×3 receivers 320.

In conclusion, the invention at least includes several characteristics. By using EDFAs and DWDMs, the optical signal pulses are not degraded in long transmitted distance. This allows the invention to use only one line of the input and the output lead fibers. The number of amplifiers in various uses is greatly reduced, resulting in low fabrication cost, low power consumption, and wide applications. Moreover, due to the use of the post EDFA 126 and the in-line EDFA 128, the sensor system can tolerate a high power loss as high as 47 dB so that the number of the sensing arrays 308 in the WDM/TDM hybrid PIFOMIS system can be effectively increased, resulting a great increase of detecting ability. Furthermore, the invention uses low cost commercial available single mode optical fiber to reduce fabrication cost of the system. The sensor system is particularly more suitable for a long distance transmission. Moreover, since the amplitude of the optical pulse signal transmitted in the lead fiber is very stable, the optical pulse signal can be amplified by EDFAs with a stable amplification.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A polarization-insensitive fiber-optic interferometric sensor system with multi-plexing property comprising:
   an optical pulse generator, used to generate an optical pulse;
   a post erbium-doped fiber amplifier (EDFA), used to receive the optical pulse, and amplify the optical pulse to be an amplified optical pulse;
   a first optical bandpass filter (OBPF), used to receive and filter the amplified optical pulse;
   a 3-port optical circulator (3POC), having a first port, a second port, and a third port, in which the first port receives an output signal from the first OBPF, wherein the 3POC can forwardly pass an inputting signal from a current port to a next port;
   a sensing array, coupled to the second port of the 3POC so as to receive the output optical pulse from the first OBPF and return a returned optical signal pulse train to the 3POC;
   an in-line EDFA, coupled to the third port of the 3POC, used to receive the returned optical signal pulse train from the sensing array;
   a second OBPF, used to receive and filter an output pulse train from the in-line EDFA; and
   a time division multiplexing (TDM) receiver, used to receive an output pulse train from the second OBPF.

2. The sensor system of claim 1, wherein each sensor of the sensing array is an unbalanced Michelson interferometer, and the interferometer includes a fiber coupler (FC) and two Faraday rotator mirrors (FRMs).

3. The sensor system of claim 1, wherein the TDM receiver comprises a time division multiplexing 3×3 (TDM-3×3) receiver.

4. The sensor system of claim 3, wherein the TDM-3×3 receiver further comprises:
   a receiver's 3POC, sequentially having a port-1, a port-2 and a port-3, in which the port-1 of the receiver's 3POC is coupled to the second OBPF;
   a first compensating interferometer, having an unbalanced Michelson interferometer, which comprises a 3×3 fiber coupler and two Faraday rotator mirrors (FRMs), in which one of three pigtailed fibers of the 3×3 fiber coupler is coupled to the port-2 of the receiver's 3POC;

a first optical receiver, a second optical receiver, and a third optical receiver, which are respectively coupled to two of the pigtailed fibers of the 3×3 fiber coupler, and the port-3 of the receiver's 3POC, used to receive three output signals of the first compensating interferometer;

first sample/hold circuit sets, coupled to the first optical receiver, the second optical receiver, and the third optical receiver;

a first time delay generator, coupled to the first sample/hold circuit sets so as to generate a plurality of delay times for the first sample/hold circuit sets to sample output signals of the first optical receiver, the second optical receiver, and the third optical receiver; and a plurality of 3×3 demodulators, used to receive and demodulate sensing signals of the sensors of the sensing array from the first sample/hold circuit sets.

5. The sensor system of claim 1, wherein the TDM receiver comprises a time division multiplexing phase-generated carrier (TDM-PGC) receiver.

6. The sensor system of claim 5, wherein the TDM-PGC receiver further comprises:

a second compensating interferometer, having an unbalanced Michelson interferometer, which comprises a 2×2 fiber coupler and two Faraday rotator mirrors (FRMs), in which a first pigtailed fiber of the 2×2 fiber coupler receives an output signal from the second OBPF;

a fourth optical receiver, used to receive an output signal from the second compensating interferometer through a second pigtailed fiber of the 2×2 fiber coupler;

second sample/hold circuit sets, coupled to the fourth optical receiver;

a second time delay generator, coupled to the second sample/hold circuit sets so as to generate a plurality of delay times for the second sample/hold circuit sets to sample output signals of the fourth optical receiver;

a plurality of phase-generated carrier (PGC) demodulators, used to receive and demodulate sensing signals of the sensors of the sensing array from the second sample/hold circuit sets; and a carrier signal generator, coupled in between the PGC demodulator and a phase modulator further included in the second compensating interferometer so as to generate a carrier signal.

7. The sensor system of claim 1, wherein the sensor system further comprises:

an input lead fiber coupled in between the first OBPF and the first port of the 3POC, and an output lead fiber coupled in between the in-line EDFA and the third port of the 3POC.

8. A polarization-insensitive fiber-optic interferometric sensor system comprising:

a plurality of optical pulse generators, used to generate a plurality of optical pulses;

a first dense wavelength division multiplexer (DWDM), used to receive and multiplex the optical pulses into a first combined pulse;

a plurality of power erbium-doped fiber amplifiers (EDFAs), which are coupled in series to amplify the first combined pulse, wherein the first one of the power EDFAs receives the first combined pulse and the last one of the power EDFAs exports an amplified first combined pulse;

a second DWDM, used to receive the amplified first combined pulse and demultiplex the amplified first combined pulse into a plurality of first amplified optical pulses with respect to each wavelength;

a plurality of first optical bandpass filters (OBPFs), each of which respectively receives and filters one of the first amplified optical pulses;

a plurality of 3-port optical circulators (3POCs), each of which has a first port, a second port, and a third port, in which the first port respectively receives the output of one of the first OBPFs;

a plurality of sensing arrays, each of which is respectively coupled to each the second port of the 3POCs;

a third DWDM, used to multiplex outputs of the 3POCs from each the third port of the 3POCs and export a second combined pulse;

a plurality of in-line EDFAs, which are coupled in series to amplify the second combined pulse, wherein the first one of the in-line EDFAs receives the first combined pulse and the last one of the in-line EDFAs exports an amplified second combined pulse;

a fourth DWDM, used to receive the amplified second combined pulse and demultiplex the amplified second combined pulse into a plurality of second amplified optical pulses with respect to the sensing arrays;

a plurality of second optical bandpass filters (OBPFs), used to respectively receive and filter the second amplified optical pulses; and a plurality of time division multiplexing (TDM) receivers, used to respectively receive outputs from the second OBPFs.

9. The sensor system of claim 8, wherein each of the sensing arrays further comprises a plurality of unbalanced Michelson compensating interferometers, and each of the compensating interferometers comprises two Faraday rotator mirrors (FRMs).

10. The sensor system of claim 8, wherein the sensor system further comprises an input lead fiber and an output lead fiber, in which the input lead fiber is coupled in between the first DWDM and the second DWDM, and the output lead fiber is coupled in between the third DWDM and the fourth DWDM.

11. The sensor system of claim 8, wherein each of the TDM receivers comprises a time division multiplexing 3×3 (TDM-3×3) receiver.

12. The sensor system of claim 11, wherein each the (TDM-3×3) receiver further comprises:

a receiver's 3POC, sequentially having a port-1, a port-2 and a port-3, in which the port-1 is respectively coupled to one of the second OBPFs;

a first compensating interferometer, having an unbalanced Michelson interferometer, which comprises a 3×3 fiber coupler and two Faraday rotator mirrors (FRMs), in which one of three pigtailed fibers of the 3×3 fiber coupler is coupled to the port-2 of the receiver's 3POC;

a first optical receiver, a second optical receiver, and a third optical receiver, which are respectively coupled to two of the pigtailed fibers of the 3×3 fiber coupler, and the port-3 of the receiver's 3POC, used to receive three output signals of the first compensating interferometer;

first sample/hold circuit sets, coupled to the first optical receiver, the second optical receiver, and the third optical receiver;

a first time delay generator, coupled to the first sample/hold circuit sets so as to generate a plurality of delay times for the first sample/hold circuit sets to sample output signals of the first optical receiver, the second optical receiver, and the third optical receiver; and a plurality of 3×3 demodulators, used to receive and demodulate sensing signals of the sensors of the sensing array from the first sample/hold circuit sets.

13. The sensor system of claim 8, wherein each of the TDM receivers comprises a time division multiplexing phase-generated carrier (TDM-PGC) receiver.

14. The sensor system of claim 13, wherein each the TDM-PGC receiver further comprises:

a second compensating interferometer, having an unbalanced Michelson interferometer, which comprises a 2×2 fiber coupler and two Faraday rotator mirrors (FRMs), in which a first pigtailed fiber of the 2×2 fiber coupler receives an output signal from the second OBPF;

a fourth optical receiver, used to receive an output signal from the second compensating interferometer through a second pigtailed fiber of the 2×2 fiber coupler;

second sample/hold circuit sets, coupled to the fourth optical receiver;

a second time delay generator, coupled to the second sample/hold circuit sets so as to generate a plurality of delay times for the second sample/hold circuit sets to sample output signals of the fourth optical receiver;

a plurality of phase-generated carrier (PGC) demodulators, used to receive and demodulate sensing signals of the sensors of the sensing array from the second sample/hold circuit sets; and a carrier signal generator, coupled in between the PGC demodulator and a phase modulator further included in the second compensating interferometer so as to generate a carrier signal.

* * * * *